United States Patent [19]
Bowles

[11] Patent Number: 5,796,980
[45] Date of Patent: Aug. 18, 1998

[54] REDUCING CACHE SNOOPING OVERHEAD IN A MULTILEVEL CACHE SYSTEM WITH INCLUSION FIELD IN SHARED CACHE INDICATING STATE OF DATA IN LOWER LEVEL CACHES

[75] Inventor: James E. Bowles, Austin, Tex.

[73] Assignee: Advanced Micro Devices Inc., Sunnyvale, Calif.

[21] Appl. No.: 605,741

[22] Filed: Feb. 22, 1996

Related U.S. Application Data

[63] Continuation-in-part of Ser. No. 462,985, Jun. 5, 1995.

[51] Int. Cl.$^6$ .................................................. G06F 12/00
[52] U.S. Cl. .................................... 395/471; 395/473
[58] Field of Search ................................ 395/449, 468, 395/471, 473, 446, 447, 472, 403

[56] References Cited

U.S. PATENT DOCUMENTS

| | | |
|---|---|---|
| 4,755,930 | 7/1988 | Wilson, Jr. et al. .................. 395/449 |
| 5,058,006 | 10/1991 | Durdan et al. ........................ 395/449 |
| 5,136,700 | 8/1992 | Thacker ................................ 395/449 |
| 5,197,139 | 3/1993 | Emma et al. .......................... 395/417 |
| 5,249,284 | 9/1993 | Kass et al. ............................ 395/468 |
| 5,265,232 | 11/1993 | Gannon et al. ....................... 395/451 |
| 5,297,269 | 3/1994 | Donaldson et al. .................. 395/472 |
| 5,369,753 | 11/1994 | Tipley .................................... 395/449 |
| 5,530,832 | 6/1996 | So et al. ................................ 395/449 |
| 5,564,035 | 10/1996 | Lai ......................................... 395/471 |
| 5,584,013 | 12/1996 | Cheong et al. ........................ 395/449 |

OTHER PUBLICATIONS

"Extended L2 Directory for L1 Residence Recording", IBM Technical Disclosure, vol.34, No.8, pp. 130–133, Jan. 1992.
Baer, Jean-Loup and Wang, Wen-Hann, "On The Inclusion Properties For Mult-Level Cache Hieararchies", Computer Architecture, 1988 International Symposium, IEEE/IEE Publications Ondisc, pp. 73–80.

*Primary Examiner*—Tod R. Swann
*Assistant Examiner*—Christopher S. Chow
*Attorney, Agent, or Firm*—Foley & Lardner

[57] ABSTRACT

A memory system for reducing cache snooping overhead for a two level cache system with multiple bus masters, has a level 2 cache connected to a main memory and a level 1 cache connected to a bus master. Each bus master has one level 1 cache assigned to it. A shared level 2 cache is connected to each of the level 1 caches. The level 2 cache has an inclusion field for each storage location within the level 2 cache. The inclusion field indicates if information held in a storage location associated with the inclusion field is contained in any of the level 1 caches connected to the shared level 2 cache, and whether that data has been modified. If there is a cache hit in the level 2 cache, the level 2 cache determines from the inclusion field that corresponds to the cache hit if the tag-address corresponding to the memory access of the bus master also resides in a level 1 cache assigned to a different bus master than the one that made the memory access, and if the corresponding data has been modified. If so, the shared level 2 cache obtains the data from the level 1 cache assigned to the other bus master, and that data is read into the level 2 cache. The data is then read from the shared level 2 cache into the level 1 cache assigned to the bus master that initiated the memory access.

4 Claims, 7 Drawing Sheets

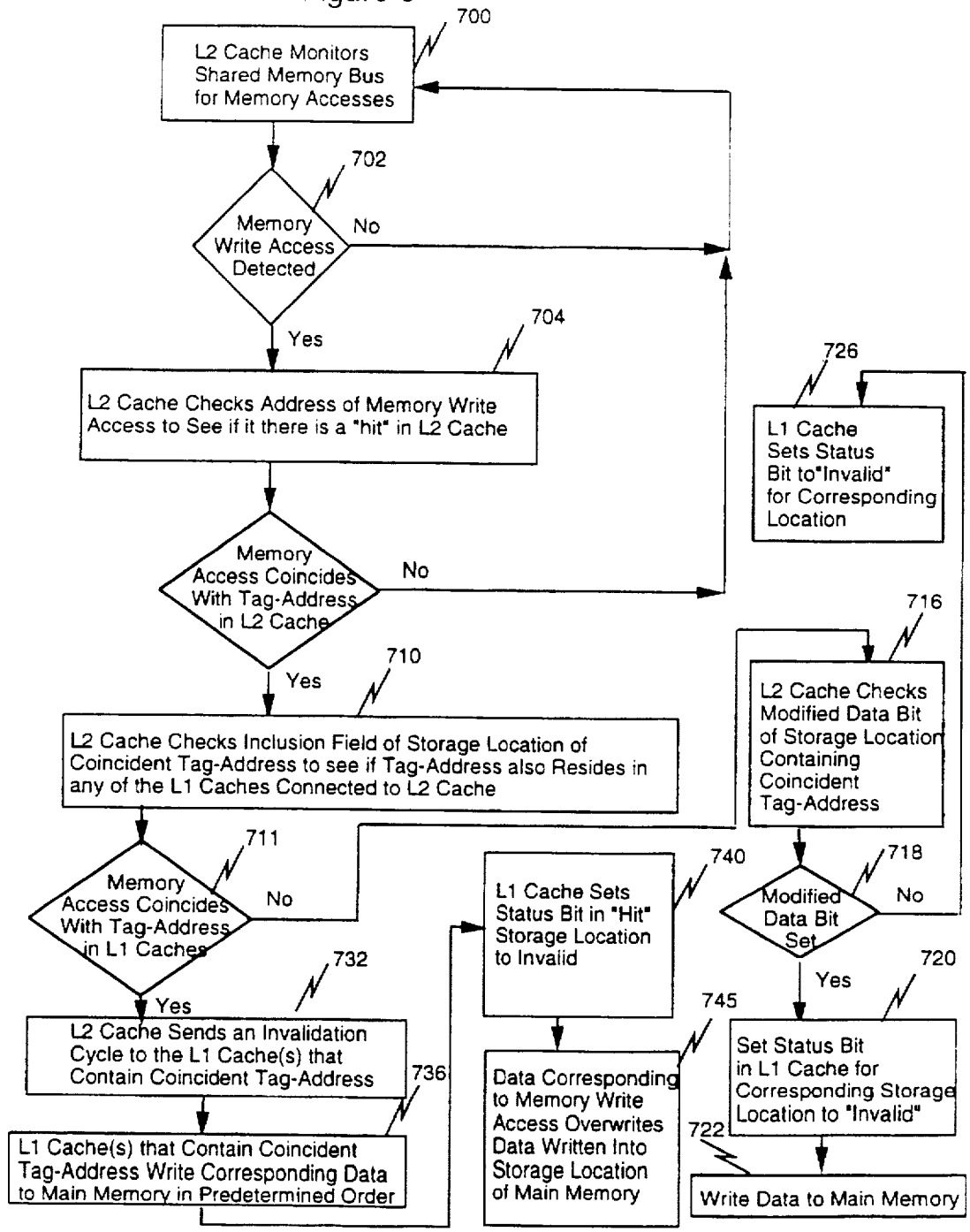

Figure 7a

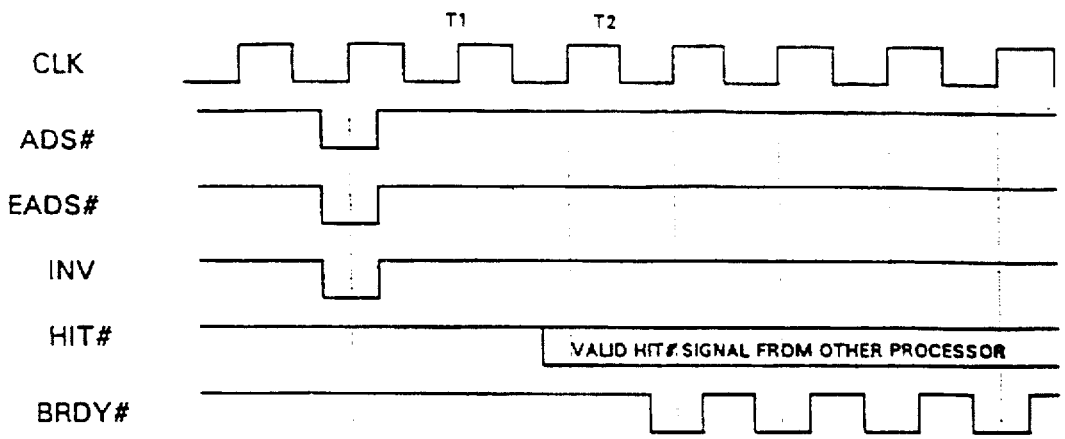

T1: Two clock cycles to perform the cache look-up
in the other processor

T2: One additional clock to sample HIT# and
determine if the burst cycle can occur

Figure 7b

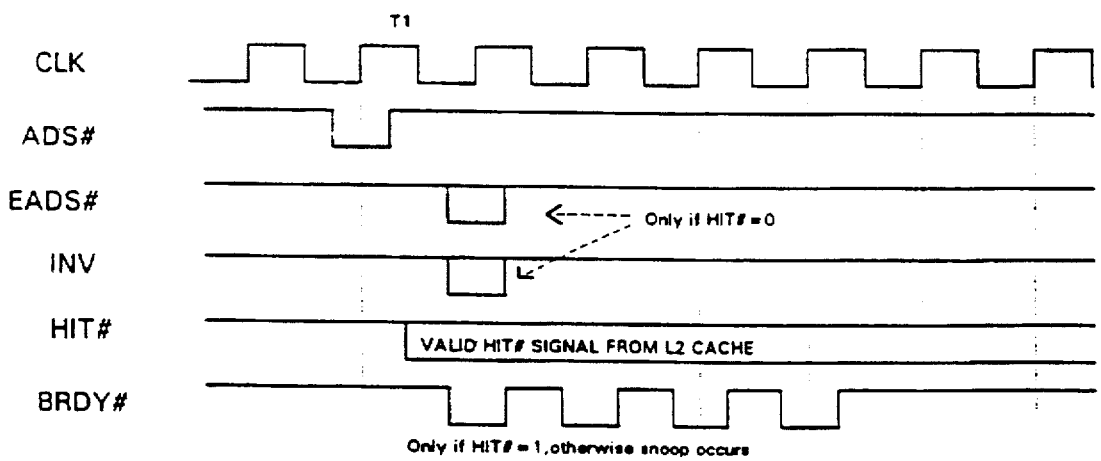

T1: One clock to perform lookup since each processor's
inclusion bit is in second level cache.

If the inclusion bit is not valid (HIT# = 1) data can be read
from L2 cache at full speed, otherwise snoop other
microprocessor if HIT# = 0 in the next clock.

Improved Invalidation And Memory Access Timing

REDUCING CACHE SNOOPING OVERHEAD IN A MULTILEVEL CACHE SYSTEM WITH INCLUSION FIELD IN SHARED CACHE INDICATING STATE OF DATA IN LOWER LEVEL CACHES

RELATED APPLICATIONS

This application is a continuation-in-part of application Ser. No. 08/462,985, filed Jun. 5, 1995.

BACKGROUND OF THE INVENTION

1. Field of the Invention

The invention relates to a method and an apparatus for reducing the cache memory access, or snooping overhead, required in a processing system with multiple processing devices having a tightly coupled cache and a shared cache. In particular, a memory system according to the invention efficiently determines, based on knowledge of whether data in a lower level cache is present and modified, if a cache hit or miss occurs in any of the lower level caches in the cache system as a result of a memory access request from any of the bus masters.

2. Description of the Related Art

For purposes of this invention, a bus master is a device which can initiate a read or a write transaction with respect to a memory. One example of such a device is a processor, such as a microprocessor. One way to increase the performance of a computer system is to decrease the time required to supply a bus master with the information it requires. Such information, which may include both data and instructions, is typically stored in a memory connected to the bus master. To access this required information, the bus master transmits an address to the memory in which the required information is stored. The memory transmits back to the bus master the information stored in the memory location designated by the address supplied by the bus master.

The time required to supply a bus master with required information may be decreased by decreasing the time lapse between the memory's receipt of the address from the bus master and the transmission of the required information to the bus master. Unfortunately, the cost of memory increases dramatically with its speed. Thus, it is rarely practical to use the fastest memory available, especially in systems requiring large memories.

Using a relatively small bank of relatively high-speed memory, typically called "cache" memory, provides a more cost effective approach to improving the average information-request to information-supply speed. Specifically, in a system having a cache memory, the bus master initially requests information it needs from the cache memory. If the information is stored in the cache memory, the request is said to be a cache "hit", and the information is provided to the bus master from the cache memory at the faster rate of the cache memory. If the required information is not stored in the cache memory, the information request is said to be a cache "miss", and the information is retrieved from the system memory at the slower transfer rate. When the information is supplied to the bus master from the system memory, a copy of the information is typically stored in the cache memory in anticipation of subsequent requests for the same information.

A multilevel cache system contains more than one cache level in the access path of the bus master to the main memory. A bus master is connected to a level 1 cache, which is connected to a level 2 cache, with itself might be connected to a level 3 cache, etc. Generally, for each bus master, the higher level caches include all of the information stored in the lower level caches, which is a principle known as inclusion. Multiple bus masters using multiple cache levels can access the common main memory via the shared memory bus. This bus usually connects the caches at the highest level assigned to each bus master. Under this scheme, each bus master system which includes the caches for that bus master can run independently of the other bus master systems sharing the same main memory until a bus master requires data which is not in any of the caches for that bus master.

Once the information requested by a bus master is supplied to it, the bus master may modify the information. The modified version of the information is then stored back into the cache memory. Thus, two versions of the information may exist simultaneously, the "old" version in the system memory and the higher level caches, and the "new" version, typically in the first level cache memory. In single bus master systems, the existence of two versions of data does not cause a problem, since the bus master, which is the only device that uses the information, retrieves the cache version of the information when that information is required by the bus master.

In systems having multiple bus masters, one bus master may require information, while the most recent version of that information is stored in a cache assigned to another bus master. In order to insure that only the most recent versions of the data are used, a mechanism must be provided to advise cache memories of requests made by any of the bus masters in the system. In multiple bus master systems, bus masters are connected to the system memory and to each other by a shared memory bus. The caches for each of the bus masters must be configured not only to supply information to their associated bus masters, but also to monitor memory access requests from other bus masters.

Memory access requests are broadcast over the shared memory bus. Every time a request for information is broadcast over the shared memory bus, the cache memories on the system must determine whether the requested information is contained within any of their storage locations. The process of determining whether information requested over the memory bus is stored in a cache memory is referred to as "snooping". If information requested on the shared memory bus is contained in a cache memory, that cache memory sends the most recent version of the requested information over the memory bus to the bus master requesting the information. The cache memory may also invalidate its version of the requested information, since the requesting bus master may modify that information, and thereby render the current version of the information invalid.

Since a bus master is not allowed to access a cache when a snooping operation is being performed on that cache, snooping operations may significantly reduce the overall performance of a cache-equipped bus master. Further, snooping operations may take up to fifty percent of the operational time in systems having two bus masters, and an even higher percentage of the operational time in systems having more than two bus masters sharing a common main memory.

In U.S. patent application Ser. No. 08/462,985, of which the present application is a continuation-in-part of, and which is assigned to AMD, Inc., a multi-level cache system is described in which the shared level two cache has an inclusion field which indicates the data present in each of the lower level caches that are connected to the shared level two cache. That way, if a memory read or write from another bus master that does not use the shared level two cache is found on the shared memory bus, the shared level two cache need only check the inclusion field array to determine if there is a "hit" in any of the level one caches. If there is a "hit", then the level two cache forces a writeback cycle, in which a cache line that corresponds to the "hit" is written back to main memory. However, if that data had never been updated by the bus-master using the level one cache which experienced the hit, then that data is either in a "shared" state, an "invalid" state, or an "exclusive" state, and is not in a "modified" state, assuming a MESI protocol is being used. Thus, the shared level two cache may perform unnecessary snoops of the level one cache, thereby taking away bus cycles from the bus master.

SUMMARY OF THE INVENTION

There is described herein a system in which two or more bus masters each have at least their own first level cache. The bus masters share a higher level cache, such as a second level cache. The shared higher level cache supports inclusion for all of the entries in the lower level caches. According to the invention, the higher level cache has separate inclusion bits for each bus master in the system. The inclusion bits include information as to which data are located in the lower level caches, and whether that data is modified or not. At the time of memory access by a first bus master, the inclusion bit is tested for each bus master to determine if a local cache associated with another bus master contains the same address, and potentially different data. If so, the first bus master aborts its access and performs an invalidation cycle in which the data in the cache is invalidated and/or the modified data is written back to the main memory.

A system according to the invention may be configured to have a higher level cache, such as a level 2 cache shared, by multiple bus masters. Each of the bus masters sharing the higher level cache, e.g., the level 2 cache, has its own level 1 cache for memory access operations. It is desirable to provide such a system in which every cache on the system need not perform a snooping operation every time a bus master requires information that is not contained in its cache. Specifically, it is desirable to provide a system wherein once there is a hit in the higher level cache, e.g., the level 2 cache, the lower level caches, e.g., the level 1 caches, that share the higher level cache need not be snooped because an inclusion field within the higher level cache indicates which of the tag-addresses stored in the higher level cache are also stored in each of the lower level caches and whether that data has been modified by the bus master.

According to one aspect of the invention, a memory system includes a first bus master and a first level 1 cache operatively connected to the first bus master. The first level 1 cache contains a first plurality of storage locations. Typically, each of the first plurality of storage locations has a data field, a tag-address field, a status field, and a data modified field. The memory system according to the invention also includes a second bus master and a second level 1 cache operatively connected to the second bus master. The second level 1 cache contains a second plurality of storage locations, with each of the second plurality of storage locations having a data field, a tag-address field, a status field, and a data modified field. The memory system further includes a level 2 cache operatively connected to the first level 1 cache and the second level 1 cache. The level 2 cache contains a third plurality of storage locations, with each of the third plurality of storage locations having a data field, a tag-address field, a status field, a data modified field and an inclusion field. The inclusion field stores inclusion information and indicates whether the tag-address associated with the data is also present in one of the first plurality of storage locations within the first level 1 cache or in one of the second plurality of storage locations within the second level 1 cache, and whether the data has been modified or not.

According to another aspect of the invention, there is a processing system having i bus masters, where i is an integer greater than 1. One of the i bus masters generates an address representative of required data for one bus master. The processing system includes a shared memory bus connected to a main memory and accessible by the i bus masters, and includes a multi-level cache system having at least two levels. In one example, a two-level cache system according to the invention includes an ith level 1 cache operatively connected to an ith bus master. The ith level 1 cache includes an ith plurality of storage locations for storing data, tag-address of the data, status of the data, and a data modified indication of the data. The ith level 1 cache supplies information in response to an address request from the ith bus master. Such a two-level cache system further includes a level 2 cache operatively connected to each of the i bus masters and the i level 1 caches. The level 2 cache includes an (i+1)th plurality of storage locations for storing data, tag-address of the data, status of the data, a data modified indication of the data, and an inclusion field of the data. The inclusion field indicates whether a tag-address associated with the inclusion field is also contained in any of the i level 1 caches connected to the level 2 cache, and whether that data has been modified in the i level 1 caches. The two-level cache system further includes monitoring means in the i level 1 caches for detecting a memory access from the ith bus master assigned to the ith level 1 cache, cache miss notification means in the i level 1 caches for notifying the level 2 cache that the memory access cannot be serviced by the ith level 1 cache, and inclusion field update means in the level 2 cache for updating an inclusion field in one of the (i+1)th plurality of storage locations within the level 2 cache.

BRIEF DESCRIPTION OF THE DRAWINGS

The invention, together with further objects and advantages thereof, may best be understood by making reference to the following description taken in conjunction with the accompanying drawings, in the several figures of which like reference numerals identify like elements, and wherein:

FIG. 6 is a flow diagram of the sequence involved when the shared level 2 cache detects a memory write access from another bus master on the shared memory bus according to the invention, and FIGS. 7a and 7b are timing diagrams showing the clock cycles required to perform cache snooping without and with an inclusion field in the shared level 2 cache, respectively.

DETAILED DESCRIPTION OF THE PREFERRED EMBODIMENTS

Figure 1:
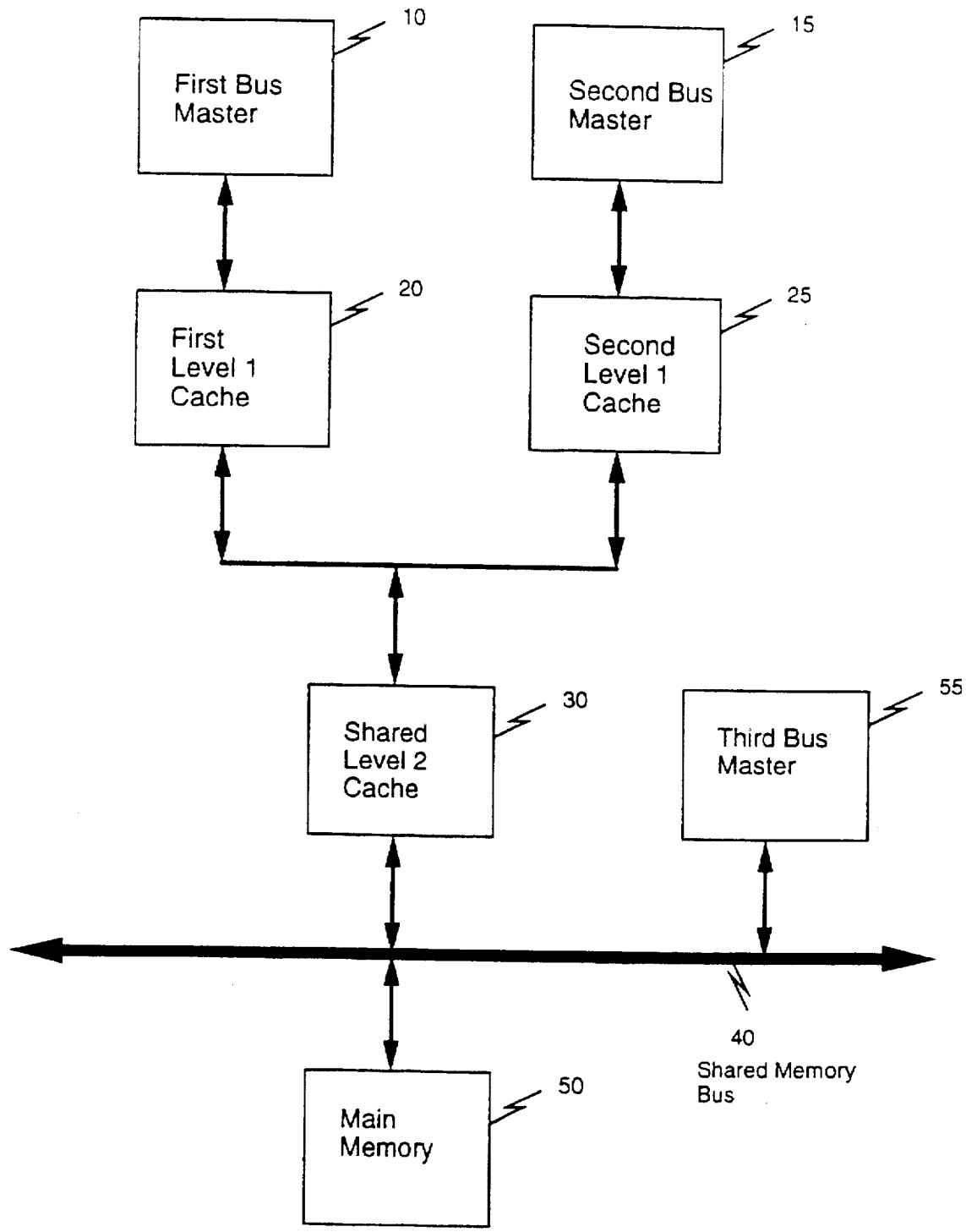
FIG. 1 illustrates in block diagram form a two-level cache system with a plurality of level 1 caches connected to a shared level 2 cache in a multiple bus master environment according to the invention.

FIG. 1 shows a two-level cache processing system with a shared level 2 cache according to the invention. While a system with two cache levels and two bus masters is shown to simplify the explanation of the invention, it will be known that any number of cache levels and bus masters may be employed and that the system shown in FIG. 1 is by way of illustration and not limitation.

FIG. 1 shows a first bus master 10, a second bus master 15, a level 1 cache 20 assigned to the first bus master 10, a level 1 cache 25 to the second bus master 15, a shared level 2 cache 30, a shared memory bus 40, and a main memory 50. FIG. 1 also shows a third bus master 55 that is connected to the shared memory bus 40, but which does not use the shared level 2 cache 30 to retrieve data.

When the first bus master 10 requests an address from main memory 50, the level 1 cache 20 assigned to the first bus master 10 first checks to see if that address is resident in any of its storage locations by comparing it against the tag addresses stored in the level 1 cache 20. If the level 1 cache 20 does not have that address resident in any of its storage locations, the shared level 2 cache 30 will next try to service the bus master address request by comparing it against the tag addresses stored in the shared level 2 cache 30. If the shared level 2 cache 30 does not have that address resident in any of its storage locations, the first bus master 10 will be serviced by main memory 50. This process is identical for a memory request by the second bus master 15, wherein the level 1 cache 25 assigned to the second bus master will first try to service that request, and if unsuccessful, the shared level 2 cache 30 will then try to service the request.

Figure 2:
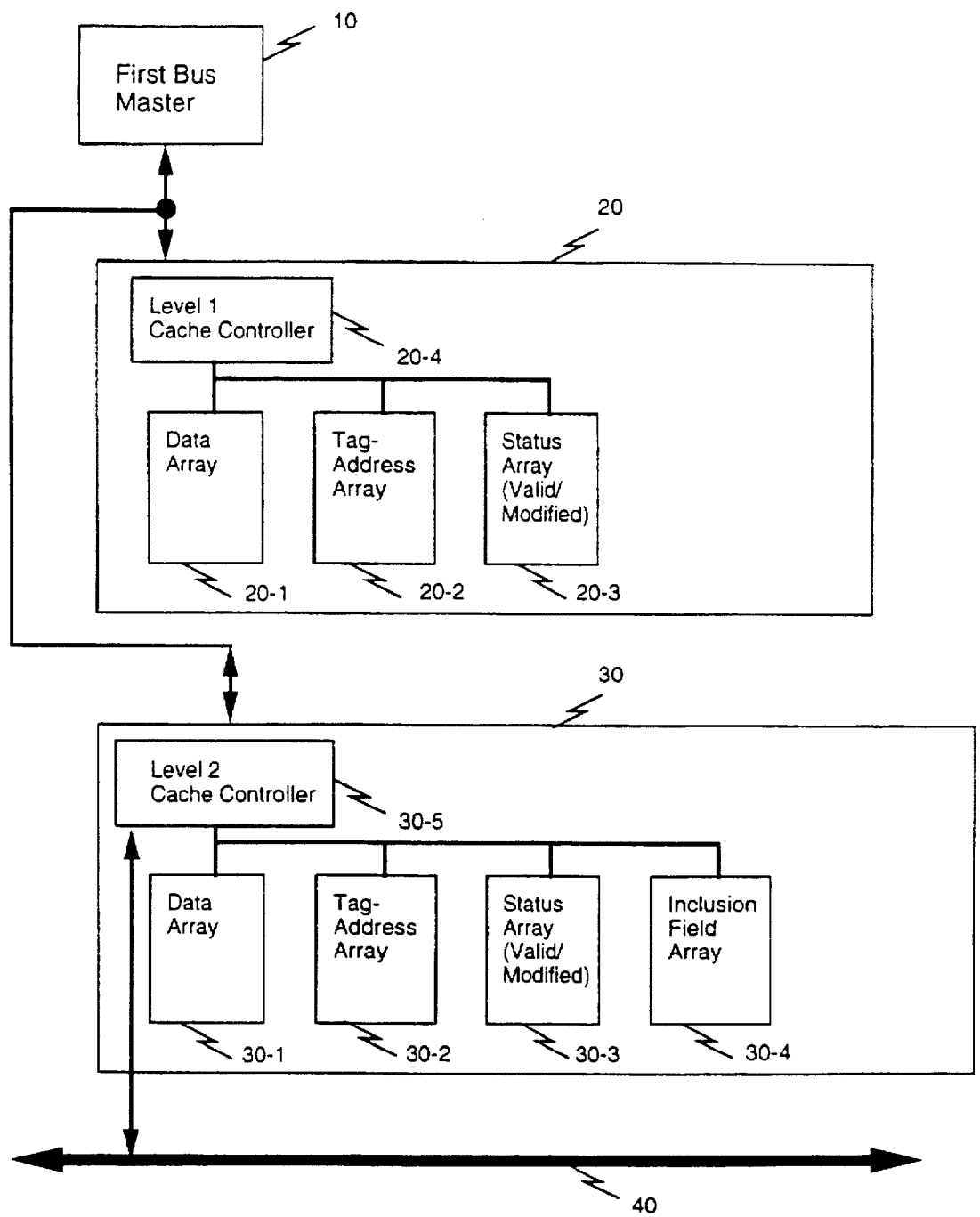
FIG. 2 illustrates in block diagram form the elements of a level 1 and level 2 cache according to the invention.

Referring now to FIG. 2, the level 1 cache 20 assigned to the first bus master contains data 20-1, tag or memory address of the data 20-2, and status of the data 20-3. The status of the data 20-3 includes an indication of whether the data is valid and whether the data has been modified. The level 1 cache 20 also has a level 1 cache controller 20-4 for detecting read and write accesses to memory made by the first bus master 10, and for informing a higher level cache (i.e., the shared level 2 cache 30) of whether the level 1 cache 20 is capable of servicing a memory access request made by the first bus master 10. The level 1 cache 25 assigned to the second bus master 15 has the same structure as the level 1 cache 20 assigned to the first bus master 10.

The shared level 2 cache 30 contains data 30-1, tag or memory address of the data 30-2, and status of that data 30-3. In addition, the shared level 2 cache 30 contains an inclusion field array 30-4. The inclusion field array 30-4 contains separate indications identifying whether the tag-address of the data corresponding to the inclusion field also resides in any of the level 1 caches 20, 25 connected to the shared level 2 cache 30, and whether that data has been modified or not by the respective bus masters 10, 15. The inclusion field array 30-4 may be configured as a one-bit array, which is set to a first logical state (i.e., logic "high" state) if both: 1) a tag-address in the shared level 2 cache 30 is also resident in one of the level 1 caches 20, 25, and 2) data corresponding to the coincident tag-address in one of the level 1 caches 20, 25 contains modified data. Thus, for each storage location in the shared level 2 cache 30, there would be an inclusion field entry for each of the lower level caches connected to the shared level 2 cache 30. In the example shown in FIG. 1, with two level 1 caches 20, 25 connected to a shared level 2 cache 30, there would be two inclusion field entries for each storage location in the shared level 2 cache 30, with one entry for the first level 1 cache 20, and the other entry for the second level 1 cache 25.

The inclusion field array 30-4 may alternatively be configured as a two-bit array of values. With this configuration, a first bit of a two-bit value is set to a first logic level (i.e., logic "high" state) if the tag-address in the shared level 2 cache 30 is also resident in the level 1 cache, and it is set to a second logic level (i.e., logic "low" state) otherwise. A second bit of the two-bit value is set to a first logic level (i.e., logic "high" state) if the data stored with the coincident tag address in the level 1 cache contains modified data, and is set to a second logic level (i.e., logic "low" state) otherwise. Thus, with this alternative configuration, for the example shown in FIG. 1, for each storage location in the shared level 2 cache 30, there would be a two-bit value for the first level 1 cache 20, and a two-bit value for the second level 1 cache 25.

The shared level 2 cache 30 also has a level 2 cache controller 30-5 which monitors the shared memory bus 40 for any memory access reads or writes. The level 2 cache controller 30-5 also performs snooping of the level 1 caches 20, 25 when required.

The level 2 cache controller 30-5 performs updating of the inclusion field array 30-4 based on tag-addresses and status of data currently stored in each of the level 1 caches 20, 25 that are connected to the shared level 2 cache 30.

The shared level 2 cache 30 is capable of identifying copyback operations (cache line replacement) of modified data performed by each of the level 1 caches 20, 25 connected to the level 2 cache 30. A copyback operation corresponds to a cache writing data which has been modified back to the main memory 50. These copyback operations may occur periodically, or upon occurrence an external copyback command sent from a bus master. In some systems, a copyback of data from the level 1 cache to main memory 50 causes the level 1 cache that made the copyback to invalidate the copied-back data in the cache, thereby allowing new data to written over the copied-back data in the cache. For these systems, the level 2 cache 30 will update its inclusion field array 30-4 accordingly, to thereby indicate that addresses corresponding to the copied-back data is no longer in the "modified" state in the level 1 cache (since the status of the previously-modified data in the level 1 cache will be set to an "invalid" state).

The shared level 2 cache 30 is also capable of updating its inclusion field array 30-4 based on other types of writebacks to main memory 50 by the level 1 caches 20, 25. For example, during a burstwrite command sent from the first bus master 10, the level 1 cache 20 assigned to the first bus master 10 will write back data to the main memory 50 that have tag-addresses that are within the memory address range of the burstwrite command. Certain systems will then invalidate the data in the level 1 cache 20 that has been burstwritten to the main memory 50, and the shared level 2 cache 30 will update its inclusion field array 30-4 accordingly.

Figure 3:
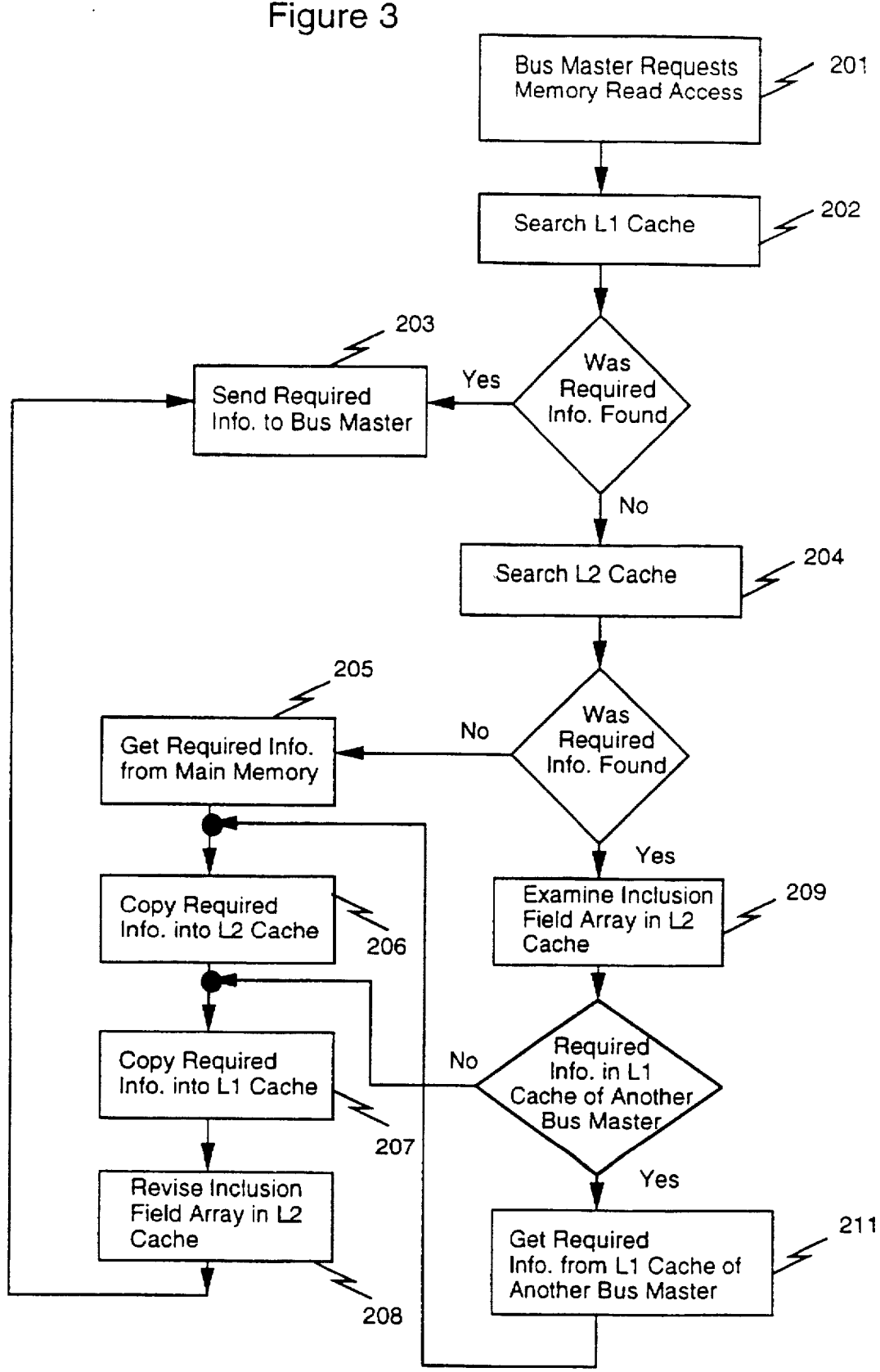
FIG. 3 is a flow diagram of the sequence involved when a level 1 cache detects a memory read access from its corresponding bus master according to the invention.

Referring now to FIG. 3, a first bus master 10 requests a memory access read, which is received by its corresponding first level 1 cache 20, as in step 201. The first level 1 cache 20 then determines if the tag-address corresponding to the memory access read request from the first bus master 10 resides in any of the storage locations within the first level 1 cache 20, as in step 202.

If there is a cache hit; i.e., if there is a tag-address in any of the storage locations within the first level 1 cache 20 that matches the address of the memory access read request by the first bus master 10, then the first level 1 cache 20 services that request, as in step 203, and send the requested information to the first bus master 10. If there is a cache miss, then the shared level 2 cache 30 attempts to service the memory read request, in which it is determined if any of the storage locations within the shared level 2 cache 30 contain a tag-address that matches the memory read access of the first bus master 10, as in step 204.

If there is a cache miss in the shared level 2 cache 30, then the information required by the first bus master 10 must be retrieved from the main memory 50, as in step 205. Once retrieved from the main memory 50, that data is copied into the shared level 2 cache 30, as in step 206, and copied into the first level 1 cache 20, as in step 207, in order to handle subsequent requests from the first bus master 10. The data is sent to the first bus master 10, as in step 203. Note that, since the new data has not been modified as yet by the first bus master 10, the inclusion field array values of the shared level 2 cache 30 corresponding to that new data indicates that the newly-written tag-address in the first level 1 cache 20 does not contain modified data (i.e., inclusion field array value corresponds to a single bit which is set equal to a logic "low" value).

If there is a cache hit in the shared level 2 cache 30, the inclusion field array value corresponding to the storage location that contains a tag-address that coincides with the memory read access is checked to see if any of the other level 1 caches, such as the second level 1 cache 25 in FIG. 1, contain the requested tag-address corresponding to the memory access from the first bus master 10 in which the coincident tag-address has modified data, as in step 209. If none of these other level 1 caches contain the required tag-address with modified data, then the shared level 2 cache 30 sends the information in the storage location within the shared level 2 cache 30 corresponding to the tag-address that matches the memory access to the first level 1 cache 20, as in step 207. The information is also sent to the requesting bus master 10, as in step 203. The shared level 2 cache 30 does not update the inclusion field array value corresponding to the storage location containing the tag-address that matches the memory read access, since even though the first level 1 cache 20 now contains that tag-address, the data corresponding to the coincident tag-address has not been modified by the first bus master 10 connected to the first level 1 cache 20.

If the inclusion field array value in the shared level 2 cache 30 indicates that one of the other level 1 caches contains the tag-address corresponding to the memory read access and the data corresponding to the coincident tag-address has been modified, then the shared level 2 cache 30 retrieves information corresponding to the coincident tag-address from the other level 1 cache (i.e., the second level 1 cache 25 in our example), as in step 206, and writes the corresponding information in a storage location within the shared level 2 cache 30 that corresponds to the tag-address that coincides with the memory read access of the first bus master 10, as in step 206. The main memory 50 may be also be updated during this writeback (not shown in FIG. 3). The requested information is then sent from the shared level 2 cache 30 to the first level 1 cache 20, as in step 207. The requested information is sent to the first bus master 10, as in step 203. Note that the inclusion field in the shared level 2 cache 30 corresponding to the tag-address for the newly written-in-data in the first level 1 cache 20 is not updated in this instance, since the newly written-in data has not been modified as yet by the first bus master 10. The sending of the information from the shared level 2 cache 30 to the first level 1 cache 25 can be done concurrently with the sending of the information from the shared level 2 cache 30 to the first bus master 10 that made the memory read access.

If a memory read access is made by a bus master that does not utilize the shared level 2 cache 30, such as the third bus master 55 as shown in FIG. 1, then the procedure is a little different than that explained above. The third bus master 55 may be an Ethernet card (with or without its own cache memory), an I/O card, a Video card, or other type of bus master that typically makes frequent memory accesses.

The invention as described herein lessens the amount of activity (i.e., snooping) that these external bus masters impose on the first and second bus masters 10, 15 that access the shared level 2 cache 30. Based on the inclusion field array, the shared level 2 cache 30 can determine if any memory accesses that it picks up on the shared memory bus 40 require it to look into (i.e., snoop) either or both of the first and second level 1 caches 20, 25 to see if those caches contain a tag-address that coincides with any of these memory accesses on the shared memory bus 40, and whether that coincident tag-address contains modified data in its respective cache line.

An important feature of the invention is the need for the level 1 caches 20, 25 to inform the level 2 cache 30 of any occurrences when a cache line in the level 1 caches 20, 25 have been modified by their corresponding processors 10, 15. Referring now to FIG. 1, if processor 10, for example, modifies data in a cache line in the level 1 cache 20, the level 1 cache 10 then notifies the shared level 2 cache 30 of the cache line in which the modification took place. This notification need only be done at the first occurrence of when a particular cache line in the level 1 cache 20 has been modified by the processor 10, since "once modified, always modified." That is, later modifications of a cache line which had its status field previously set to the "modified state" will not cause the level 1 cache to notify the level 2 cache of this re-update. If, however, another cache line in the level 1 cache 20 is modified by its respective bus master 10 so that its status changes from either "shared", "invalid", or "exclusive" to "modified", then notification of this change is sent to the shared level 2 cache 30. It is actually the level 2 cache controller 30-5 that receives this notification from the level 1 cache controller 20-4 (see FIG. 2).

Note that the shared level 2 cache 30 is able to monitor all writes to main memory 50 by the level 1 caches 20, 25. The level 1 caches 20, 25 are not updated with the first write until the shared level 2 cache 30 is updated with the first write, in order to maintain strong write ordering. For each write to main memory 50 by any of the level 1 caches 20, 25, the shared level 2 cache 30 updates the inclusion field array value corresponding to the storage location in the shared level 2 cache that has a same tag address as the tag address of the data written into the main memory 50 from one of the level 1 caches 20, 25. The inclusion field array value is updated to reflect that the corresponding storage location in the level 1 cache that is being written to the main memory 50 is no longer in the "modified" state.

If any of the level 1 caches 20, 25 contain the tag-address that coincides with the memory access originating from the third bus master 55, and if the data corresponding to that tag-address has been modified or updated by the corresponding first or second bus master 10, 15 (as determined from the status field), then that modified data will be written back to the shared level 2 cache 30 and to main memory 50. This procedure ensures that the third bus master 55 retrieves the most current value of the data corresponding to the memory read access.

Figure 4:
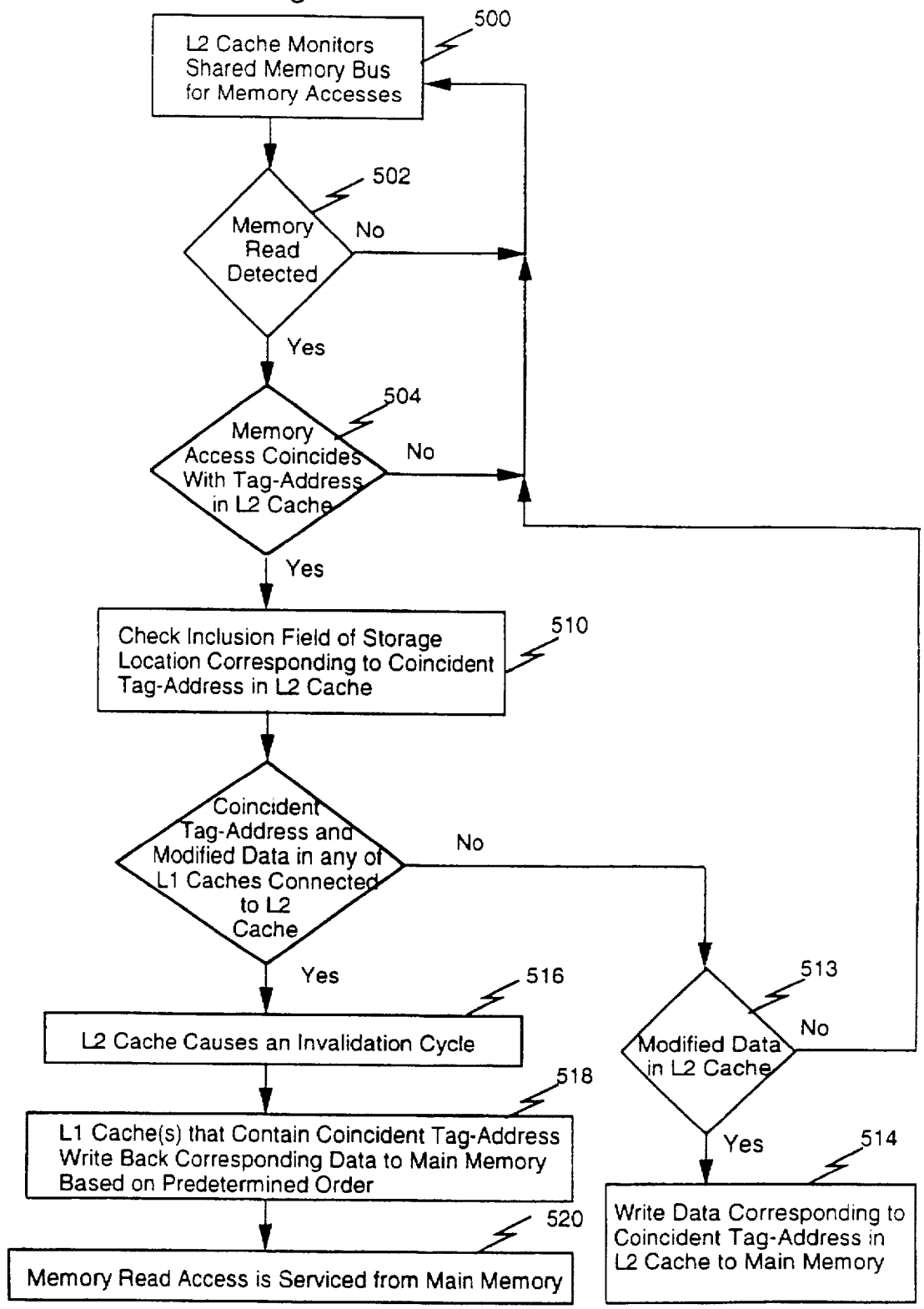
FIG. 4 is a flow diagram of the sequence involved when the shared level 2 cache detects a memory read access from another bus master on the shared memory bus according to the invention.

An explanation of the process involving an external memory read access, such as by the third bus master 55, will be explained with reference to FIG. 4. The shared level 2 cache 30 monitors the shared memory bus 40 for any memory accesses by bus masters other than the first and second bus masters 10, 15 that use the shared level 2 cache 30, as in step 500. If a memory read access from an external bus master, such as from the third bus master 55, is detected on the shared memory bus 40, as in step 502, the shared level 2 cache 30 determines if the tag-address corresponding to the memory read access is resident in any of its storage locations, as in step 504. If the tag-address does not reside in the shared level 2 cache 30, then by inclusion, the tag-address does not reside in any of the level 1 caches 20, 25 that are directly connected to the shared level 2 cache 30. Thus, the process returns back to step 500 to look for other external memory accesses.

If, however, there is a "hit" in the shared level 2 cache 30, then the shared level 2 cache 30 checks the inclusion field array value corresponding to the storage location which has the tag-address that coincides with the external memory read access and has modified data, as in step 510. If the inclusion field array value indicates that none of the level 1 caches 20, 25 contain the tag-address that coincides with the external memory read access and which also has modified data in its respective cache line, the shared level 2 cache checks the corresponding status field to see if the storage location that resulted in a hit in the shared level 2 cache 30 has been updated by one of the first and second bus masters 10, 15.

If the status field indicates that the data had been modified, as in step 513, then the data is written back to main memory 50 by the shared level 2 cache 30 in a data writeback cycle, as in step 514. If the status field indicates that the data has not been modified, then the process returns back to step 500.

On the other hand, if the inclusion field array value of the corresponding storage location in the shared level 2 cache 30 indicates that either (or both) of the level 1 caches 20, 25 contains the "hit" tag-address and that the corresponding "hit" data has been modified, then the shared level 2 cache 30 forces an invalidation cycle, as in step 516. This cannot occur in the MESI protocol, but may be allowable in other types of protocols. The invalidation cycle causes the level 1 cache that contains the "hit" storage location with modified data to write the modified data in the "hit" storage location back to main memory 50, as in step 518.

In the MESI protocol, only one of the level 1 caches 20, 25 can contain modified data for a corresponding memory address location, and so there cannot be a situation where more than one of the level 1 caches contains a "hit" storage location having a status field that indicates that the data has been modified. However, in other types of cache protocols, this situation may occur. The MESI protocol allows for "shared" data to exist in both of the level 1 caches 20, 25, but this shared data cannot be modified by either of the first or second bus masters 10, 15. Thus, the description given hereinbelow of simultaneous hits in the level 1 caches 20, 25 only applies to those systems (not the MESI protocol) that allow for this situation to occur.

The MESI protocol allows for data in a cache to have any of four possible states: 1) modified (i.e., data in cache is different from data in main memory for the same memory address), 2) exclusive (i.e., data in memory is the same as the data in the cache for the same memory address), 3) shared (i.e., data in cache is the same as the data in the cache for the same memory address, but that same memory address also exists in another cache, in which the corresponding data may have been modified), and 4) invalid (i.e., data in cache is different from data in main memory for the same memory address).

The invalidation cycle makes the data in the corresponding "hit" storage location in the level 1 caches 20, 25 invalid, and causes the corresponding data in the "hit" storage location to be written back to main memory 50. This procedure ensures that the memory read access of the third bus master 55 obtains the most-recent data that is available, which may not be resident in the main memory 50 at the time the memory read access was made by the third bus master 55. Once the data has been written to the main memory 50 (and to the shared level 2 cache 30), as in step 518, the memory read access from the third bus master 55 is serviced from the main memory 50, as in step 520.

Figure 5:
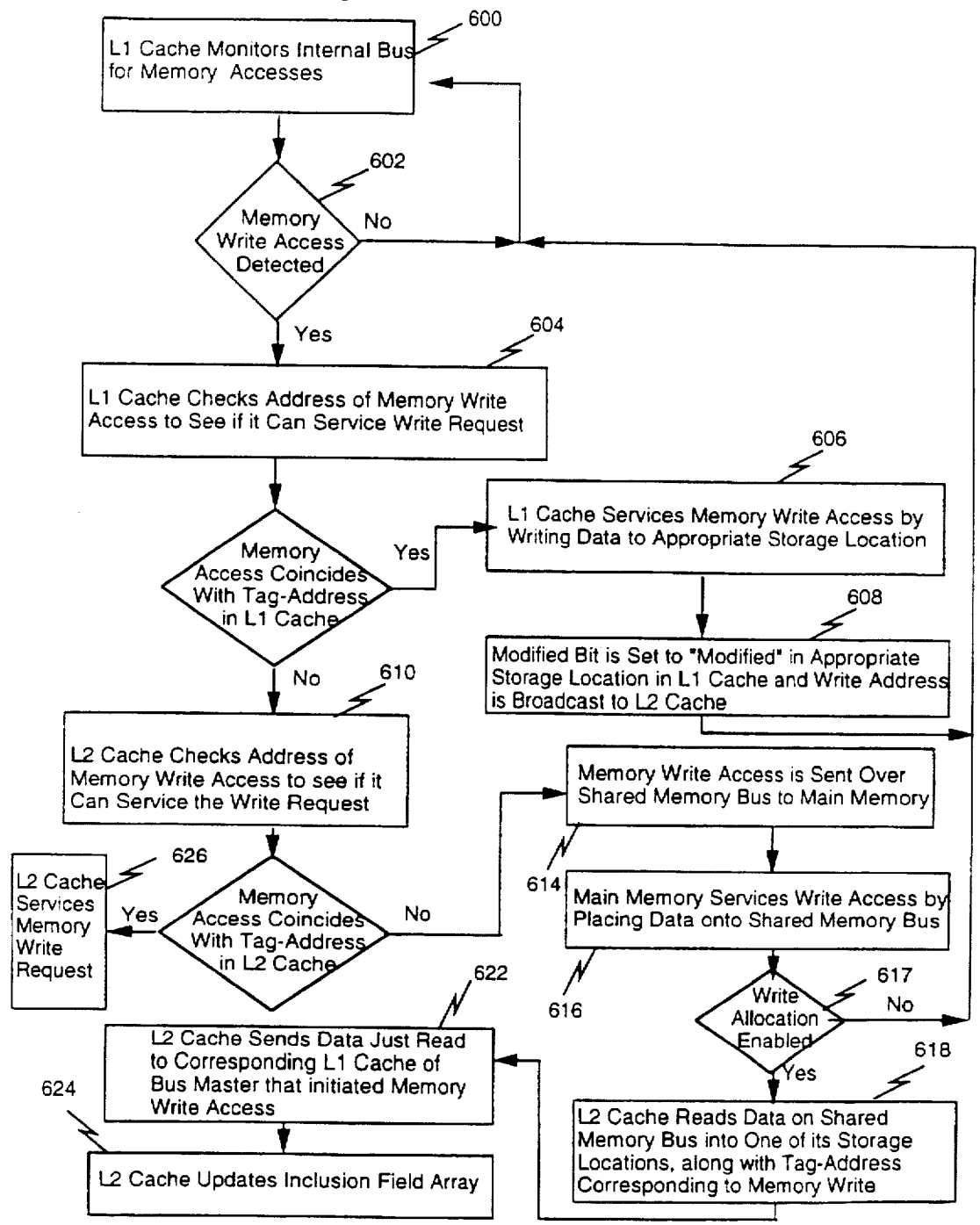
FIG. 5 is a flow diagram of the sequence involved when a level 1 cache detects a memory write access from its corresponding bus master according to the invention.

FIG. 5 describes the sequence for a write request from a bus master assigned to one of the level 1 caches 20, 25 connected to the shared level 2 cache 30, with the data in the level 1 caches 20, 25 being either in the "shared" state or with the level 1 caches 20, 25 being in a "write-through" mode. Each of the level 1 caches 20, 25 monitors an internal bus connecting them to their respective first and second bus masters 10, 15, in order to detect a memory access request, as in step 600. If a memory write access is made by a bus master that uses the shared level 2 cache 30, such as a memory write access request from the first bus master 10, as in step 602, the corresponding level 1 cache, such as level 1 cache 20, attempts to service that request, as in step 604.

If the memory address corresponding to the memory write access coincides with a tag-address that is resident in the corresponding level 1 cache 20, the data corresponding to the memory write access is written to the storage location corresponding to the "hit" tag-address in the level 1 cache 20, as in step 606. The status field is set to a "modified" state for that storage location to indicate that it now contains modified data, and the write address is broadcast to the shared level 2 cache 30, as in step 608. As described earlier, the shared level 2 cache 30 is made aware of the change to the "modified" state for the updated cache line in the level 1 cache 20, and the corresponding inclusion field array value in the shared level 2 cache 20 is updated. Since the memory write access has been serviced by the level 1 cache 20 of the bus master 10 that sent the memory write access request, no further steps are required, and the process returns to the monitoring step 600.

Note that although no other operation is shown after step 608, if the level 1 cache was a writeback cache, then it would write that data back to main memory 50, and in the MESI protocol, the corresponding written-back storage location would have its status bit set to an "invalid" state. In this instance, the shared level 2 cache 30 would update its inclusion field array to indicate that a storage location in the level 2 cache 30 that corresponds to the written-back storage location in the level 1 cache is no longer in the "modified" state in the level 1 cache.

If, however, there is not a "hit" in the corresponding level 1 cache 20, then the shared level 2 cache 30 attempts to service the memory write access, as in step 610. If there is not a "hit" in the shared level 2 cache 30, then the memory write access request is sent over the shared memory bus 40, as in step 614, and the memory write access request is serviced from the main memory 50. The main memory 50 responds to the memory write access by sending the data corresponding to the address of the memory write access on the shared memory bus 40, as in step 616.

Next, a determination is made as to whether "write allocation" has been enabled for the level 2 cache 30, as in step 617. If write allocation has not been enabled, then the level 2 cache does not write the data sent to the main memory 50 into one of its available storage locations, and the sequence returns to step 600. If write allocation has been enabled, then the level 2 cache does write the data sent to the main memory 50 into one of its available storage locations, as in step 618.

If write allocation is enabled, the shared level 2 cache 30 also sends the data to the level 1 cache 20 of the bus master that made the memory write access, as in step 622. Like the shared level 2 cache 30, if the level 1 cache has "write allocation" enabled, then it will write the data into one of its available storage locations. The shared level 2 cache 30 sets the inclusion field array value corresponding to the storage location that was written into the shared level 2 cache 30 to indicate that the tag-address corresponding to that data is also resident in one of the level 1 caches (i.e., level 1 cache 20) that is connected to the shared level 2 cache 30, and that the newly written-in data is not modified, as in step 624.

If there is a "hit" in the shared level 2 cache 30, then the shared level 2 cache 30 services the memory write access request, as in step 626. In addition, the shared level 2 cache 30 may supply that data to the level 1 cache 20, so that the level 1 cache 20 will be able to service the next memory access made by the first bus master 10 to that same address. However, the shared level 2 cache 30 does not supply the level 1 cache 20 with the data in the MESI protocol, since the memory is not updated in this protocol. For other types of protocols, however, this may be allowed to occur, and thus the shared level 2 cache 30 supplies the data to be written into the level 1 cache 20. Since the data is not modified given that the data is the same as that resident in the main memory 50, the inclusion field array is not changed.

Referring now to FIG. 6, if a memory write access is made by a bus master that does not use the shared level 2 cache 30, such as a memory write access made by the third bus master 55, the shared level 2 cache 30 detects this "external" memory write access on the shared memory bus 40, as in step 700. By monitoring the shared memory bus 40, the shared level 2 cache 30 will be able to detect the presence of a memory write access on the shared memory bus 40, as in step 702. The shared level 2 cache 30 determines if the address corresponding to the external memory write access "hits" a tag-address resident in any of the storage locations in the shared level 2 cache 30, as in step 704. If there is not a "hit", the process returns back to the monitoring step 700 to look for other memory accesses on the shared memory bus 40.

If there is a "hit" in the shared level 2 cache 30, then the inclusion field array value corresponding to the "hit" storage location is checked to determine if there is also a "hit" in any of the level 1 caches 20, 25 that are connected to the shared level 2 cache 30 and if the "hit" location contains modified data, as in step 710. If there is not a "hit with modified data" in any of the level 1 caches 20, 25 based on the corresponding inclusion field array value ("No" for step 711), the shared level 2 cache 30 checks the status field in the shared level 2 cache 30 for that corresponding storage location, as in step 716. If the status field indicates that the data has been modified, as in step 718, the storage location corresponding to that modified data has its status set to an "invalid" state, as in step 720, and the modified data is written back to main memory 50, as in step 722. If the data in the corresponding storage location in the shared level 2 cache 30 was not modified based on the checking of the status field, as in step 718, that data has its status set to an "invalid" state, as in step 726. In this instance, the unmodified data is not written back to main memory 50.

If the corresponding inclusion field array value indicates that one or more of the level 1 caches 20, 25 that are connected to the shared level 2 cache 30 do contain the tag-address that corresponds to the address of the external memory write access as well as having modified data in the cache line of the coincident tag-address ("Yes" in step 711), the shared level 2 cache 30 sends an invalidation cycle to these level 1 caches that are "hit", as in step 732. The invalidation cycle causes the level 1 cache or caches that contain the coincident tag-address with modified data to write the data associated with the "hit" storage location back to main memory 50, as in step 736. The level 1 cache or caches that contain the "hit" storage location also set the status bit of the "hit" storage location to an "invalid" state, as in step 740. That way, when a bus master attempts to read data from the "hit" storage location, it will have to obtain that data from either the shared level 2 cache 30 (if it is in there and "valid") or from the main memory 50. Further, the shared level 2 cache 30 is notified of the change of state from "modified" to "invalid" of the corresponding cache line written to the main memory 50, and the shared level 2 cache 30 updates its inclusion field array accordingly.

The process of having the data from the level 1 cache written back to main memory 50 is required in order to ensure that all memory writes are seen by all bus masters of the multiple bus master system. The data has been written into the main memory 50 from the level 1 cache (or caches) that experienced the "hit" will be overwritten in the main memory 50 by the external memory write access, as in step 745.

Referring now to FIGS. 7a and 7b, a timing diagram showing the advantages of this invention is described. In FIG. 7a, it takes two lookup cycles to perform a cache lookup in a level 1 cache assigned to a bus master that has not made the memory access request. In this case, once the required tag-address is found in the shared level 2 cache 30, the shared level 2 cache 30 must snoop each of the level 1 caches to determine if that tag-address is also resident in any of those caches.

However, using the inclusion field array in the shared level 2 cache 30 as described above, it only takes one clock cycle to perform a lookup of the contents of each of the level 1 caches, as shown in FIG. 7b. A clock cycle is saved by the system according to the invention since all the information the shared level 2 cache 30 needs to determine whether it has to snoop into the level 1 caches is contained in the inclusion field array resident in the shared level 2 cache 30.

It is to be understood that the detailed drawings and specific examples given describe preferred embodiments of the invention and are for purpose of illustration, that the apparatus and method of the invention is not limited to the precise details and conditions disclosed, and that various changes may be made therein without departing from the spirit of the invention which is defined by the following claims.

For example, while the above description of the system according to the invention has been made with reference to a two-level cache system with two level 1 caches and a shared level 2 cache, the system would be equally applicable to an n-level cache system with any number of caches at each particular level, and with a shared cache at any of the levels above the lowest level. That is, a cache system with shared caches at more than one level can be envisioned, in which the above description of the system according to the invention would work to lessen the number of cache snoops required, and to thereby free up more time for the lower level caches to serve their respective bus masters.

Also, although the above description of the system according to the invention has been made with reference to the MESI protocol, the system would be equally applicable to any of a number of memory protocols, which have a "modified" state as well as other states of data stored in cache memory.

What is claimed is:

1. A method of reducing cache snooping overhead in a two-level cache system with a first bus master, a second bus master, a first level 1 cache connected to said first bus master via a first bus, a second level 1 cache connected to said second bus master via a second bus, a shared level 2 cache connected to said first level 1 cache and said second level 1 cache and a main memory, the method comprising the steps of:

a) detecting a memory read request on said first bus by said first level 1 cache;
   b) determining if said first level 1 cache can process said memory read request by determining if a tag-address of said memory read request corresponds to a tag-address for each of a plurality of storage locations in said first level 1 cache;
   c) comparing said tag address of said memory read request to a tag-address for each of a plurality of storage locations of said shared level 2 cache if said first level 1 cache cannot process said memory read request;
   d) if there is a correspondence in said shared level 2 cache, checking an inclusion field for a corresponding storage location in said shared level 2 cache to determine if said second level 1 cache contains modified data in a storage location that has the tag-address corresponding to said memory read request;
   e) if said second level 1 cache contains modified data in the storage location that has the tag-address corresponding to said memory read request, obtaining said modified data from said second level 1 cache and storing said modified data in said shared level 2 cache;
   f) writing said modified data from said shared level 2 cache to a storage location within said first level 1 cache;
   g) writing said modified data from said shared level 2 cache to said main memory;
   h) writing said modified data from said first level 1 cache to said first bus master; and
   i) updating an inclusion field for said corresponding storage location within said shared level 2 cache to indicate that data in both of said first and second level 1 caches corresponding to said coincident tag-address is currently in an unmodified state.

2. A method as recited in claim 1, wherein said data in said first level 1 cache corresponding to said coincident tag-address is indicated as being in the unmodified state due to said first bus master not having modified said data corresponding to said coincident tag-address as yet, and wherein said data in said second level 1 cache corresponding to said coincident tag-address is indicated as being in the unmodified state due to the writing of said modified data from said second level 1 cache to said main memory.

3. A method of reducing cache snooping overhead in a two-level cache system having a plurality of bus masters, a plurality of level 1 caches, and a level 2 cache operatively connected to said plurality of level 1 caches over an internal data bus and an internal address bus and to a main memory over a shared external memory bus, the method comprising the steps of:

(A) detecting a memory read access output from one bus master of said plurality of bus masters by one of said plurality of level 1 caches assigned to and operatively connected to said one bus master;
   (B) comparing an address corresponding to said memory read access to a tag-address for each of a plurality of storage locations within said one of said level 1 caches to determine if said memory read access address coincides with any of said tag-addresses stored within said one of said level 1 caches;
   (C) sending information residing in one of said plurality of storage locations within said one of said level 1 caches if said tag-address corresponding to said one of said plurality of storage locations coincides with said memory read access address;
   (D) if said memory read access address does not coincide with any of said tag-addresses stored within said one of said level 1 caches, comparing said memory read access address to a tag-address for each of a plurality of storage locations within said level 2 cache to determine if said level 2 cache contains a tag-address coinciding with said memory read access address; and
      (1) if said level 2 cache does not contain any tag-address that coincides with said memory read access address, obtaining information corresponding to said memory read access address from said main memory over said shared memory bus;
      (2) if said level 2 cache does contain a tag-address that coincides with said memory read access address, checking an inclusion field corresponding to one of said plurality of storage locations within said level 2 cache which has said coincident tag-address stored therein to determine if said coincident tag-address is resident in any of said plurality of level 1 caches connected to said level 2 cache and if data stored in a storage location corresponding to said coincident tag-address has been modified; wherein
         (a) if said inclusion field for said one storage location within said level 2 cache indicates that said tag-address does not reside in any of said plurality of level 1 caches connected to said level 2 cache:
            (1) said one of said level 1 caches copies said information corresponding to said coincident tag-address from said level 2 cache into an available one of said plurality of storage locations within said one of said level 1 caches;
            (2) said one of said level 1 caches sends said information residing in said available one of said plurality of storage locations within said one of said level 1 caches to said one of said bus masters;
            (3) said level 2 cache updates said inclusion field corresponding to said one of said plurality of storage locations within said level 2 cache which has said coincident tag-address stored therein to indicate that said one of said level 1 caches contains said coincident tag-address;

(b) if said inclusion field for said one storage location within said level 2 cache indicates that said tag-address does reside in another of said plurality of level 1 caches connected to said level 2 cache;

(1) said another of said level 1 caches sends said information corresponding to said coincident tag-address to said level 2 cache;

(2) said level 2 cache retrieves said information corresponding to said coincident tag-address from said another of said level 1 caches and copying said information into an available one of said plurality of storage locations within said one level 2 cache;

(3) said one of said level 1 caches copies said information corresponding to said coincident tag-address from said level 2 cache into an available one of said plurality of storage locations within said one of said level 1 caches;

(4) said one of said level 1 caches sends said information corresponding to said coincident tag-address to said one of said bus masters; and (5) said level 2 cache updates said inclusion field corresponding to said one of said plurality of storage locations within said level 2 cache to indicate that said one of said level 1 caches contains said coincident tag-address stored therein.

4. A method as recited in claim 3, wherein:

(b) (6) said another level 1 cache sets a status flag for said coincident tag-address to indicate that said information stored in a storage location corresponding to said coincident tag-address is invalid.

* * * * *